(12) United States Patent
Quenzer et al.

(10) Patent No.: US 6,700,299 B2
(45) Date of Patent: Mar. 2, 2004

(54) ASSEMBLY HAVING VARIABLE CAPACITANCE

(75) Inventors: Hans-Joachim Quenzer, Itzehoe (DE); Bernd Wagner, Looft (DE); Beatrice Wenk, Oelixdorf (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 33 days.

(21) Appl. No.: 10/343,975

(22) PCT Filed: Aug. 2, 2001

(86) PCT No.: PCT/DE01/02960
§ 371 (c)(1),
(2), (4) Date: Mar. 31, 2003

(87) PCT Pub. No.: WO02/12117
PCT Pub. Date: Feb. 14, 2002

(65) Prior Publication Data
US 2004/0012299 A1 Jan. 22, 2004

(30) Foreign Application Priority Data
Aug. 9, 2000 (DE) .......................................... 100 38 723

(51) Int. Cl.[7] .................................................. H03H 9/70
(52) U.S. Cl. ........................................ 310/311; 310/309
(58) Field of Search ................................ 310/311, 309

(56) References Cited

U.S. PATENT DOCUMENTS 5,164,688 A    11/1992  Larson .......................... 333/33
5,543,765 A    8/1996   Cachier
5,994,816 A    11/1999  Dhuler et al.

FOREIGN PATENT DOCUMENTS

EP    0 391 126 A1    10/1990

Primary Examiner—Nicholas Ponomarenko
Assistant Examiner—Iraj A. Mohandesi
(74) Attorney, Agent, or Firm—Breiner & Breiner, L.L.C.

(57) ABSTRACT

The present invention relates to an assembly of variable capacitance as well as to a method of operating the assembly. In the assembly, a variable capacitor is formed by a variable coverage or a variable distance of at least one first (4) and one second electrically conductive region (5). The first electrically conductive region (4) is configured on or in a substrate (1) and said second electrically conductive region (5) is configured on or in an actuator element (3) of a first micro-mechanical actuator (2). The actuator (2) is disposed on the substrate (1) in such a way that it can perform a movement of the actuator element (3) with the second region (5) along a surface of the substrate (1) at different positions relative to the first region (4), at which positions the second region (5) overlaps the first region (4) at least partly. Moreover, holding means (6, 10, 11) are provided which are capable of pulling or pushing the actuator element (3) in the different positions towards the substrate (1) or a mechanical stop (13) on the substrate (1), and of holding it in these positions.

Figure 1:
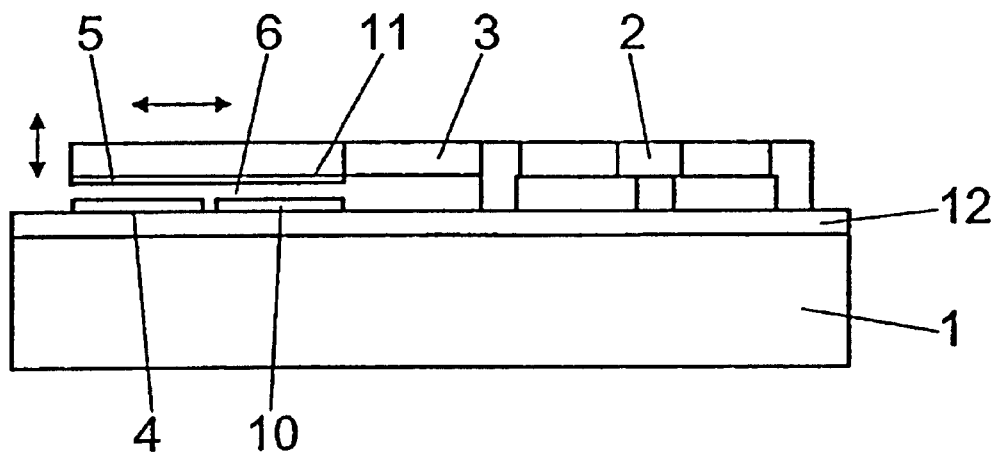

The inventive assembly serves to implement a variable capacitance that presents a high stability in resistance to outside influences according to its respective setting.

20 Claims, 3 Drawing Sheets

ASSEMBLY HAVING VARIABLE CAPACITANCE

FIELD OF THE INVENTION

The present invention relates to an assembly of variable capacitance in accordance with the introductory clause of Patent claim 1, as well as to a method of setting a predeterminable capacitance by application of this assembly.

The principle field of application of the present invention is within the domain of high-frequency technology, particularly in applications in communication technology. In this field, there is an ever-increasing demand for settable high-frequency capacitance levels at a maximum of quality achievable. So far, semiconductor components, so-called varactors, have been used to this end, which, however, reach Q-factor levels between 20 and 40 at maximum. Specifically for the application in mobile telephony or cellular phones, however, Q-factors of at least 100 are desirable. These high Q-factors in a resonant circuit can be achieved, at present, only with the use of micro-mechanical capacitors.

PRIOR ART

Capacitors manufactured by micro-engineering means are mechanically mobile elements that permit a variation of the distance or the overlapping or coverage degree of two capacitor plates for setting different capacitance levels. When such mobile elements are used a reaction of the component to exterior accelerations cannot be completely precluded, however. To this adds that in the high-frequency range at the frequencies from 0.8 to 2 GHz, which are specifically employed in cellular telephones and with the intended low attenuation levels, mainly metal materials are used as basic material for the mobile elements. Their specific density is definitely higher than the density in silicon, for instance, so that the mass of the mobile element is additionally increased by these materials. Low driving voltage levels and the resulting low driving forces for the mobile elements, in combination with the desired positioning distances of several 10 $\mu$m, require comparatively soft suspending systems.

On the other hand, a settable capacitor for mobile application should be as stable as possible so that neither thermal nor mechanical influences from the outside cannot lead to a drift in capacitance. This resistance, particularly to accelerations, cannot be achieved with the afore-described properties of the known micro-mechanical assemblies.

The present invention is therefore based on the problem of providing an assembly of variable capacitance as well as a method of operating this assembly, which ensure a high stability of the respective capacitance set in resistance to outside influences.

BRIEF DESCRIPTION OF THE INVENTION

The problem of the invention is solved by the assembly according to claim 1 as well as by the method according to claim 18. Expedient embodiments of the assembly as well as of the method are the subject matters of the dependent Claims.

In the inventive assembly, the variable capacitance is constituted by a variable coverage or a variable distance of at least one first and one second electrically conductive region. In the context of the present patent application, the term "coverage" denotes an at least partial mutual overlapping or coverage of the two regions, seen in a viewing direction substantially orthogonal on or parallel to the surface of the substrate of the assembly.

The first electrically conductive region is configured here on or in the substrate while the second electrically conductive region is configured on or in an actuator element of a first micro-mechanical actuator. Both regions are preferably constituted by plane layers or plate-shaped elements and are substantially parallel to each other whenever the capacitance is set. However, this is not a definitely required prerequisite for the function of the assembly.

The first micro-mechanical actuator is so configured and disposed on the substrate that it is capable of performing a movement of the actuator element with the second region along the surface of the substrate at different positions relative to the first region, where the second region overlaps, at least partly, the first region. The first region is preferably disposed in or below the substrate surface and in parallel with the latter. The first region, however, may also extend in the form of a separate structure in a direction orthogonal on the substrate surface.

In the different positions which the actuator element may take, hence different distances and/or degrees of overlapping coverage prevail between the first and second regions, which gives rise to a different capacitance level. In accordance with the present invention, moreover holding means are provided on the substrate, which are capable of pulling or pushing the actuator element in the different positions towards the substrate or a mechanical stop on the substrate, and of holding it in this position. This holding function of the present assembly prevents a variation of the respective positions set and hence of the capacitance level set in the event of outside influences acting upon it.

The fixing of the actuator element relative to the substrate or the first region, respectively, can be ensured by both an electrostatic holding force and a further holding element producing a purely mechanical action upon the actuator element.

The holding means for the implementation of an electrostatic holding function can be achieved here in a very simple manner by the configuration of further electrically conductive regions on or in the actuator element and on or in the substrate, which are opposed to each other in the different positions to be set, so that the actuator element will be pulled towards the substrate surface due to the application of a differential voltage between these further electrically conductive regions. As a matter of fact, either an insulating layer must be configured over the additional electrically conductive region on the actuator element or on the substrate, or the respective regions are held by spacer or stops on the substrate or on the actuator element at a distance in order to avoid a short circuit. This applies also to the first and second electrically conductive regions that constitute the variable capacitance. These regions, too, must not come into direct contact with each other when the holding position is realised.

The holding means may also be implemented by a thermo-mechanical micro actuator. This micro actuator is so configured and disposed relative to the first micro-mechanical actuator that in response to a thermal excitation, it will be deflected in a substantially orthogonal direction on the surface of the substrate and that a first section of the actuator element of the first micro-mechanical actuator in the different positions to be set or that can be set up reaches up to a position underneath a second section of the thermo-mechanical actuator—if the latter is in a deflected state. When the thermo-mechanical actuator is switched off the actuator element of the first micro-mechanical actuator is then clamped between the first section of the thermo-mechanical actuator and the substrate. Due to this clamping effect, a holding function can be expediently implemented, which does not require that energy be supplied during the holding function. For release of this holding position, the thermo-mechanical actuator is, in its turn, heated so that it will expand or will be deflected, respectively, and hence releases again the first micro-mechanical actuator.

In addition, the respective sections of the two actuators, which are superimposed on each other, may present corresponding structures that permit a mutual engagement or mutual hooking at the respective holding positions. This ensures a particularly stable holding position.

The first micro-mechanical actuator may be configured, for instance, as electrostatic or thermo-mechanical actuator. With appropriate suitability, micro actuators operating on other driving principles can, equally be employed, of course. Electrostatic micro actuators are, however, particularly well suitable for the application in a network-independent device such as a cellular telephone, due to their low energy consumption. Moreover, an electrostatic operation permits high-speed switching in the range of 100 $\mu$s.

The structure of suitable micro-mechanical actuators is common to those skilled in the art, which are appropriate for the application in the inventive assembly. The common methods of microstructure technology can be applied for the manufacture of such micro actuators and of the present assembly. For the manufacture of the variable capacitors, specifically those methods come into question, which operate either on the basis of polysilicon or on methods for the realisation of the mechanical components proper. Both manufacturing techniques are part of the field of superficial micro mechanics.

In operation of the inventive assembly, the first micro-mechanical actuator is deflected in the envisaged manner and when the desired position or capacitance, respectively, is reached the holding means are controlled to maintain this position. The respective actual position of the actuator element may preferably be realised by measuring an appropriate reference capacitance (or differential capacitance, respectively) on the substrate. The measurement of this reference capacitance during the deflection enables a very high resolution or a very precise setting of the variable capacitance. The reference capacitance can be constituted by additional small capacitors that may be adjacent to the variable capacitance proper (high-frequency capacitance). These additional capacitors may be employed as position-sensitive sensors. The actual target capacitance, however, is reached only when the holding function is activated because this holding function varies the distance between the first and second electrically conductive regions again, at least in the preferred embodiment of the assembly. In the operation of the present assembly in a closed-loop arrangement, with integration of the additional reference capacitor or reference capacitors, respectively, hence the desired capacitance of the assembly can be set with a very high precision.

In an expedient operating mode, the first micro-mechanical actuator is periodically controlled at its natural frequency. This can be realised in a simple manner particularly when this actuator is driven in an electrostatic manner. The second electrically conductive region periodically sweeps over the first electrically conductive region and, when the desired position is reached, it is fixed by controlling the holding means so that the desired capacitance value is maintained. Due to the periodic control, wide deflections of the actuator element can be reached with comparatively low driving voltages. Moreover, in this variant of the operating mode of the assembly, the above-described closed-loop assembly is preferably employed for determining the position.

The operating range of the inventive assembly can be extended by the provision that a number of additional switchable capacitors are disposed on the substrate. These switchable complementary capacitors consist, for instance, of invariable capacitors that can be additionally connected via appropriate high-frequency switches of the variable capacitance. The additional switchable discrete capacitance elements may also be implemented in their capacitors in a binary arrangement. Due to the combination of such a capacitor network with the variable capacitance proper, it is possible to set a wide range of capacitance levels.

In another alternative embodiment, several ones among the inventive assemblies are disposed on a substrate whose variable capacitance elements are connected in parallel.

Figure 2:
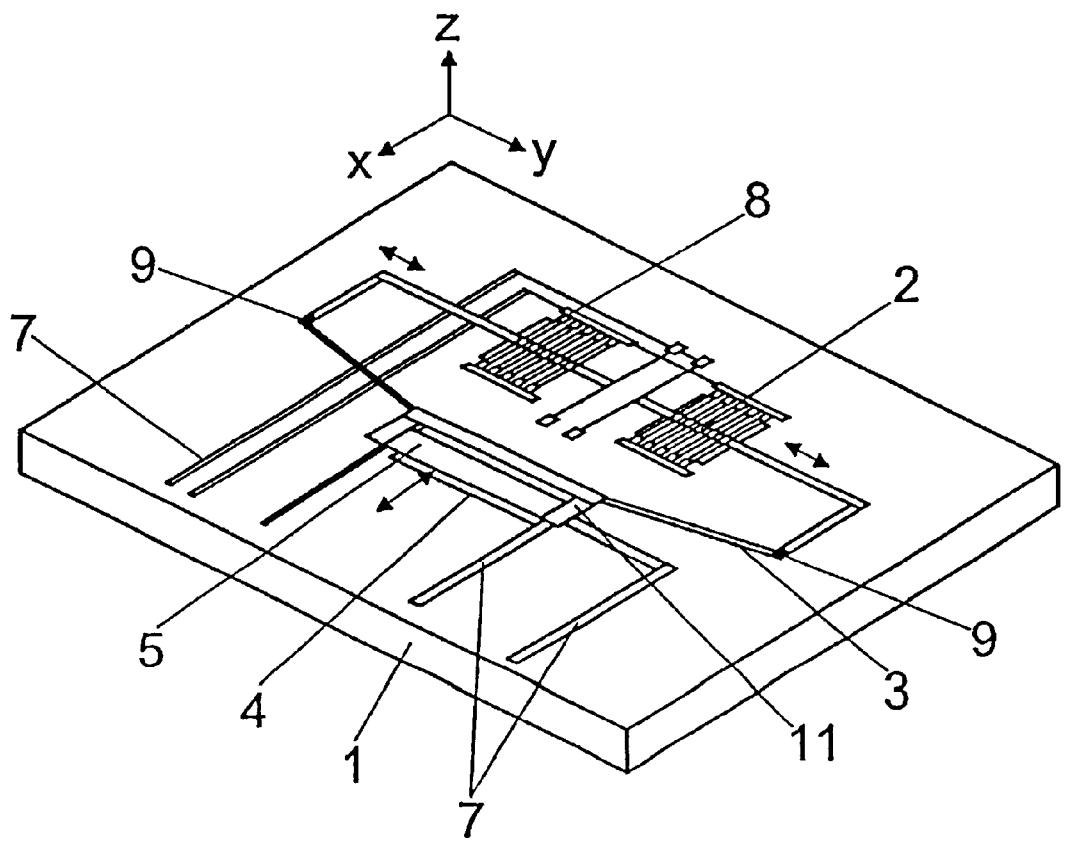
Figure 3:
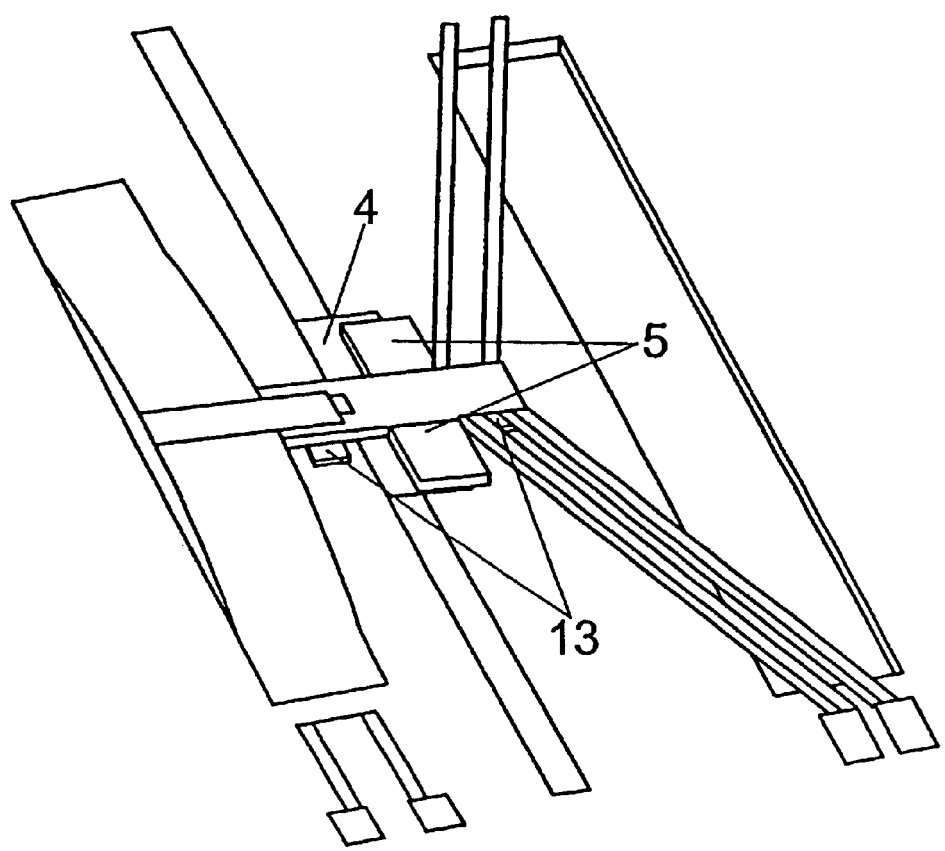
Figure 3:
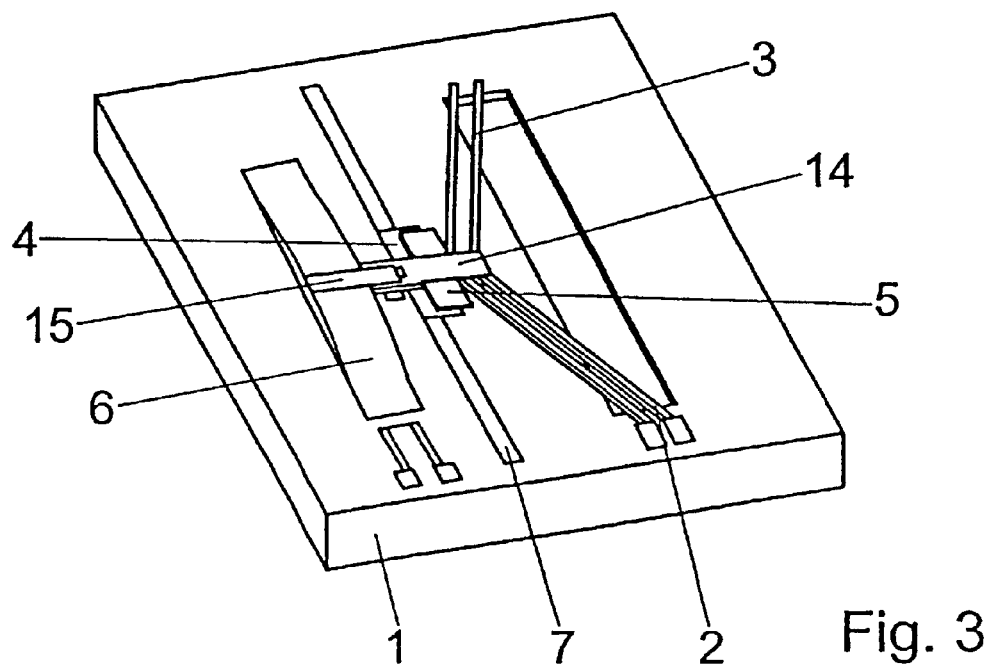
Figure 4:
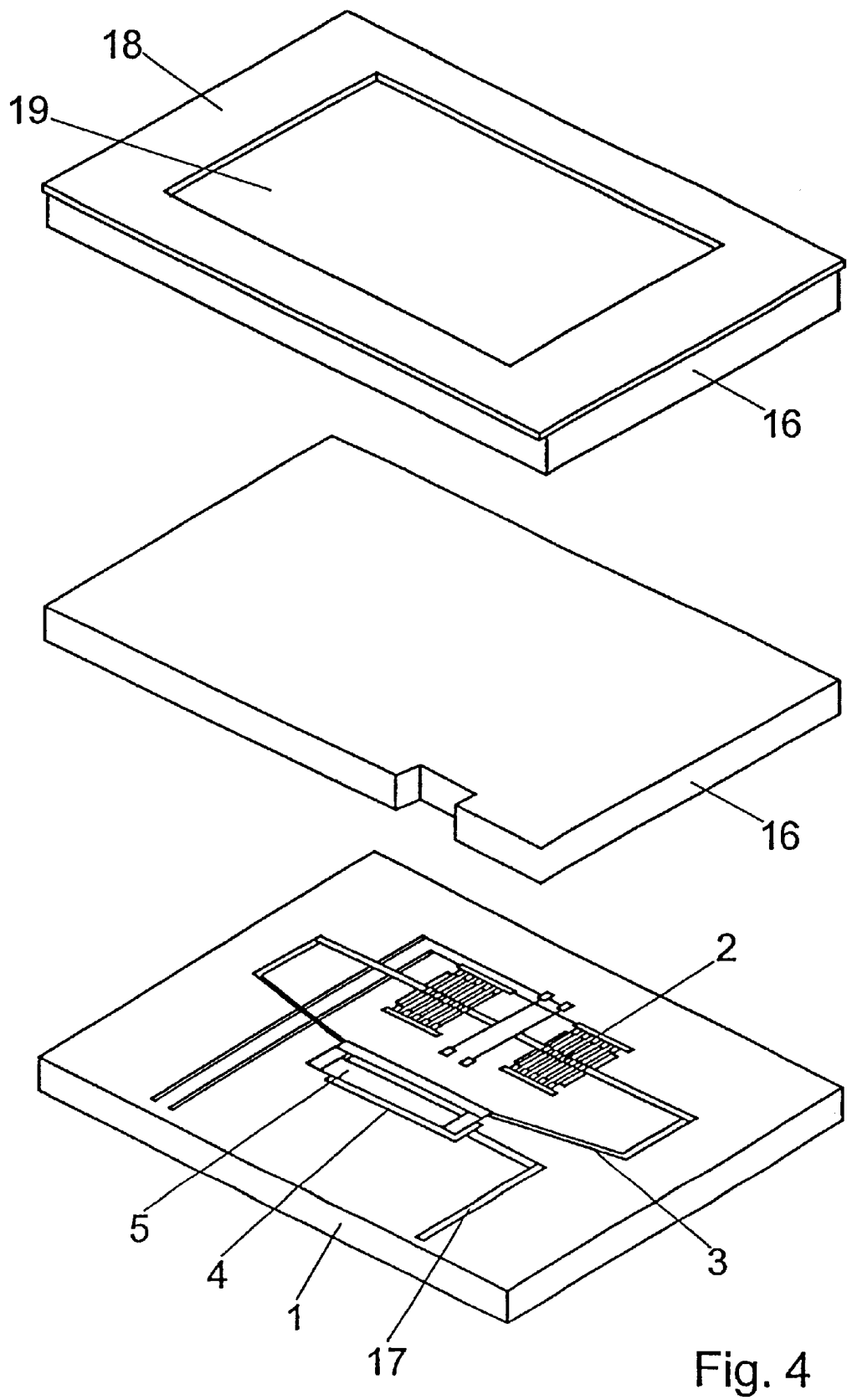

The inventive assembly as well as the associated method will be described again in the following by embodiments, with reference to the drawings, in an exemplary form, without a restriction of the general inventive idea. In the drawings:

FIG. 1 illustrates a first embodiment of the configuration of an inventive assembly with electrostatic drive means;

FIG. 2 a 3D view of the example shown in FIG. 1;

FIG. 3 shows a second embodiment of a configuration of the inventive assembly with thermo-mechanical drive means; and FIG. 4 is a view of a further example of an embodiment of the inventive assembly.

WAYS OF REALISING THE INVENTION

FIG. 1 shows a first example of a conceivable embodiment of the inventive assembly. In this embodiment, electrostatically operated actuators are used to vary the capacitance and to realise the holding function. The first micro-mechanical actuator 2—referred to as lateral actuator—generates a stroke of its actuator element 3 in parallel with the surface of the substrate 1. With this lateral actuator 2, hence the setting of the overlapping or coverage of the first electrically conductive region 4 and of the second electrically conductive region 5 is achieved to form the capacitance. The first electrically conductive region 4 is here disposed on an insulating layer 12 on the surface of the substrate 1. The second electrically conductive region 5 is formed on the underside of the actuator element 3.

The holding function is achieved by a second micro-mechanical actuator that is formed by two mutually opposed electrically conductive regions 10, 11 on the surface of the substrate 1 or on the underside of the actuator element 3, respectively. This holding means, which will be referred to as vertical actuator, pulls the actuator element 3 down onto the substrate 1 after it has reached its nominal position, whilst it fixes the position of the actuator element 3 or of the second region 5, respectively, relative to the first region 4, in this manner. The directions of movement of the vertical actuator and the lateral actuator are roughly indicated by the arrows in the illustration. The first actuator element 3 is attracted onto the substrate 1 by means of the vertical actuator 6 takes place up to corresponding stop structures on the substrate, which are not illustrated in the Figure. These insulated supports prevent an electrical short-circuit of the variable capacitance formed by the two electrically conductive regions 4, 5.

FIG. 2 illustrates a three-dimensional view of an inventive assembly as illustrated in FIG. 1. In this Figure, too, the substrate 1 with the first electrically conductive region 4 can be recognised again, on which the lateral actuator 2 is disposed with an appropriate actuator element 3. The actuator element 3 is formed here by beam-shaped elements carrying a plate-like element 5 on its end as second electrically conductive region. Apart from this second region 5, electrically conductive regions 11 are provided that cooperate with electrically conductive regions 10 located on the substrate 1 to constitute the vertical actuator 6. The lateral electrostatic drive of the first actuator 2 is implemented via capacitors 8 with parallel plates, which are disposed in a comb-like arrangement. Thus, a movement along the y-axis is achieved, which is indicated by two arrows. In order to achieve a maximum of lateral stroke possible by means of the electrostatic drive system, the actuator element 3 of the, present example is equipped with a mechanical converter that increases the achievable stroke by a factor of roughly 5 to 6. This conversion is achieved and simultaneously amplified by two bending joints 9 that convert the movement along the y-direction into a movement along the x-direction. The resulting movement along the x-direction is equally indicated by an arrow. On account of this mechanical conversion, it is possible to achieve strokes of 20 to 30 $\mu$m at electrostatic driving voltages of less than 12 V.

The leads 7 to the actuators 2, 6 or of the variable capacitor 4, 5, respectively, are schematically indicated in the Figure.

FIG. 3 illustrates a second embodiment of a configuration of the inventive assembly. In this example, thermo-mechanical actuators are employed not only for the generation of the lateral deflection but also for the implementation of the holding function. In the Figure, the substrate 1 is with the first electrically conductive region 4 can be recognised again. Moreover, the horizontal thermo-mechanical actuator 2 as well as the vertical thermo-mechanical actuator 6 are illustrated on the substrate. The first thermo-mechanical actuator 2 moves the upper plate 5 of the high-frequency capacitor in a horizontal direction over the substrate 1. Due to the two capacitor plates 4, 5 overlapping, the different capacitance levels can be set. The lateral actuator 2 consists here of an arrangement of bending elements 3 whose height exceeds their width. When heated by means of an integrated heater below these bending elements 3, the entire actuator or the entire bending element moves in parallel with the substrate surface. The plate-like second electrically conductive region 5 is disposed on the actuator element 3 under a further plate-like cantilever arm 14 that extends in the direction of movement.

The vertical actuator 5 consists of a plate-shaped element whose width is substantially wider than its thickness and which is clamped on both ends on the substrate 1. Due to this configuration, the plate when heated bends in a direction orthogonal on the surface of the substrate 1. The heating is performed by current flowing through heating conductors or heating layers integrated into the plate.

When a defined ON/OFF switching sequence is observed for the two actuators 2, 6 it is possible to hold the lateral actuator 2 in its position due to the lowering movement of the vertical actuator 6. To set a desired capacitance value, the lateral actuator 2 is therefore activated and displaced into a defined position so that the required degree of coverage of the two capacitor surfaces 4, 5 is adjusted. With this deflection, the cantilever arm 14 of the lateral actuator is pushed until it is located under a cantilever arm 15 of the vertical actuator 6 that must equally be in its deflected position by that point of time. When the vertical actuator 6 is switched off it is lowered onto the cantilever arm 14 of the lateral actuator 2, clamping it on the substrate or on appropriate supporting areas 13 on the substrate, respectively. The supporting areas 13 can be seen in the upper left section of the enlarged view in this Figure. With the application of this mechanical clamping action the disadvantage of the high energy demand is eliminated, which is present in thermo-mechanical actuators. In this assembly, the electrical energy must be supplied only during the comparatively short switching phases.

The use of thermo-mechanical actuators presents, on the other hand, the particular advantage that it permits the achievement of comparatively wide lateral movements and hence comparatively wide capacitance setting ranges. The Figures also shows schematically indicated structures that permit hooking of the cantilever arm 14 of the lateral actuator 2 with the cantilever arm 15 of the vertical actuator 6.

FIG. 4 finally illustrates another embodiment of the design of an inventive assembly wherein a cover chip 16 is mounted on the substrate 1 to protect the assembly. The assembly as such, with the lateral actuator 2, the actuator element 3 and the capacitor 4, 5, corresponds to the assembly of FIGS. 1 and 2. In this example, the feed lines leading to the high-frequency capacitor 4, 5 are designed as micro strip-type lines 17 in order to achieve the lowest attenuation possible on the lead. To this end, the interior of the cover 16, which is shown again in a bottom view in the upper part of the illustration, is coated with an appropriate metal layer 19. This metal layer 19 may be manufactured, for example, of copper, gold or silver. The cover may be mounted either on the wafer level or on the chip level when the assembly is manufactured. In any case, the cover should, however, be mounted before the wafer is separated, in order to prevent soiling of the assembly. The metal layer 19 is surrounded by a solder glass frame 18 in this example.

LIST OF REFERENCE NUMERALS 1 substrate
2 first or lateral micro actuator
3 actuator element
4 first electrically conductive region
5 second electrically conductive region
6 second or vertical micro actuator
7 leads
8 parallel-plate capacitors
9 bending joints
10 third electrically conductive region
11 fourth electrically conductive region
12 insulating layer
13 supporting area
14 cantilever arm on the lateral actuator
15 cantilever arm on the vertical actuator
16 cover chip
17 micro strip-type line
18 solder glass frame
19 metal coating

What is claimed is:
1. Assembly of variable capacitance comprising a variable coverage or a variable distance of at least one first electrically conductive area and at least one second electrically conductive area, with said at least one first electrically conductive area being configured on or in a substrate and with said at least one second electrically conductive area being on or in an actuator element of a first micro-mechanical actuator that is disposed on said substrate in such a way that said first micro-mechanical actuator is capable of performing, by means of a first drive system, movement of said actuator element with said at least one second electrically conductive area along a surface of said substrate at different positions relative to said at least one first electrically conductive area at which positions said at least one second electrically conductive area overlaps said at least one first electrically conductive area at least partly; and holding means capable, by means of a second drive system independent of said first drive system, of pulling or pushing said actuator element in said different positions towards said substrate or a mechanical stop on said substrate and of holding said actuator element in such positions.

2. Assembly according to claim 1, wherein said holding means includes at least one third electrically conductive area on or in said substrate and at least one fourth electrically conductive area on or in said actuator element that overlap each other in the different positions of said actuator element at least partly and are capable of being subjected to a difference in electrical voltage.

3. Assembly according to claim 1, wherein said holding means includes a second micro-mechanical actuator.

4. Assembly according to claim 3, wherein said second micro-mechanical actuator is a thermo-mechanical actuator that is so configured and disposed relative to said first micro-mechanical actuator that said second micro-mechanical actuator is deflected in a direction substantially orthogonal on the surface of said substrate in response to thermal excitation and that a first section of said actuator element of said first micro-mechanical actuator in the different positions reaches up to a zone underneath a second section of said second micro-mechanical actuator in a deflected state.

5. Assembly according to claim 4, wherein said second mirco-mechanical actuator includes one or several beam-shaped elements that are clamped on both sides of said substrate.

6. Assembly according to claim 4 wherein, said first section of said actuator element of said first micro-mechanical actuator is a plate-like cantilever arm that extends along a direction of movement of said actuator element.

7. Assembly according to claim 4, wherein said second section of said second micro-mechanical actuator is a plate-like cantilever arm that extends in a direction opposite to a direction of movement of said actuator element of said first micro-mechanical actuator.

8. Assembly according to claim 4, wherein said first section and said second section are constructed and arranged such that they engage each other when the thermal excitation of said second micro-mechanical actuator is terminated while said actuator element of said first micro-mechanical actuator is in said different positions.

9. Assembly according to claim 1, wherein said first micro-mechanical actuator is an electrostatic micro actuator.

10. Assembly according to claim 9, wherein said first micro-mechanical actuator comprises a drive system with parallel-plate capacitors in a comb-like arrangement.

11. Assembly according to claim 9, wherein said actuator element comprises bending joints to enlarge a stroke of movement that can be achieved with said first micro-mechanical actuator.

12. Assembly according to claim 1, wherein said first micro-mechanical actuator is a thermo-mechanical micro actuator.

13. Assembly according to claim 12, wherein said first micro-mechanical actuator includes one or several beam-shaped elements that are clamped on both sides of said substrate.

14. Assembly according to claim 1, wherein said at least one first electrically conductive area and said at least one second electrically conductive area are plate-like areas or elements.

15. Assembly according to claim 1, wherein electrical leads to said at least one first electrically conductive area and said at least one second electrically conductive area are micro strip-type lines and that a protective cover for said micro-mechanical actuator on said substrate comprises a metal coating on its inner surface.

16. Assembly according to claim 1 further comprising invariable capacitors configured on said substrate, which are adapted to be switched separately via switching elements parallel with said variable capacitor formed by said at least one first electrically conductive area and said at least one second electrically conductive area.

17. Assembly according to one of claims 1 to 16, wherein one or more of said assembly are present and are connected in parallel.

18. Method of setting a predeterminable capacitance by means of an assembly according to one of claims 1 to 16, wherein said actuator element of said first micro-mechanical actuator is moved to a position in which said at least one second electrically conductive area presents a spacing from and an at least partial coverage with said at least one first electrically conductive area, which correspond to said predeterminable capacitance, and said holding means are controlled for holding at this position.

19. Method according to claim 18, wherein a respective actual position of said actuator element is detected by a measurement of a reference capacitance between one or several regions provided on said actuator element and on said substrate.

20. Method according to claim 18, wherein said first micro-mechanical actuator is operated at its resonance frequency.

* * * * *